United States Patent
Wu

(10) Patent No.: US 9,890,830 B2
(45) Date of Patent: Feb. 13, 2018

(54) LINK UNIT AND LINK ASSEMBLY HAVING THE SAME

(71) Applicant: KMC CHAIN INDUSTRIAL CO., LTD., Tainan (TW)

(72) Inventor: Daniel Wu, Tainan (TW)

(73) Assignee: KMC CHAIN INDUSTRIAL CO., LTD., Tainan (TW)

( * ) Notice: Subject to any disclaimer, the term of this patent is extended or adjusted under 35 U.S.C. 154(b) by 109 days.

(21) Appl. No.: 14/967,029

(22) Filed: Dec. 11, 2015

(65) Prior Publication Data
US 2016/0169324 A1 Jun. 16, 2016

(30) Foreign Application Priority Data
Dec. 12, 2014 (TW) .............................. 103143480 A

(51) Int. Cl.
| | | |
|---|---|---|
| F16G 15/10 | (2006.01) | |
| F16G 13/02 | (2006.01) | |
| F16G 13/06 | (2006.01) | |
| F16G 13/07 | (2006.01) | |
| F16G 15/00 | (2006.01) | |

(52) U.S. Cl.
CPC ............. F16G 13/06 (2013.01); F16G 13/07 (2013.01); F16G 15/00 (2013.01)

(58) Field of Classification Search
CPC ..... B65G 17/38; B65G 2201/06; F16G 13/06; F16G 13/02; F16G 15/00
USPC ......................................... 474/218, 227–231
See application file for complete search history.

(56) References Cited

U.S. PATENT DOCUMENTS

| | | | | |
|---|---|---|---|---|
| 237,771 A * | 2/1881 | Paine | ...................... | F16G 13/02 474/227 |
| 282,536 A * | 8/1883 | Legg | ....................... | F16G 13/02 474/227 |
| 610,583 A * | 9/1898 | Fox | .......................... | F16G 13/06 139/333 |
| 610,751 A * | 9/1898 | Wood | ...................... | F16G 13/02 474/227 |
| 628,386 A * | 7/1899 | Berry et al. | ............ | F16G 13/06 474/220 |
| 664,256 A * | 12/1900 | Gates | ...................... | F16G 13/02 474/227 |
| 758,913 A * | 5/1904 | Hampton | ................ | F16G 13/02 474/227 |

(Continued)

FOREIGN PATENT DOCUMENTS

TW 201018807 A1 5/2010

*Primary Examiner* — Henry Y Liu
(74) *Attorney, Agent, or Firm* — Kirton McConkie; Evan R. Witt

(57) ABSTRACT

A link unit includes two first chain plates and an assembling pin. Each of the first chain plates has a first inner end section, a first outer end section misaligned from the first inner end section, and opposite inner and outer side surfaces. The first outer end section of each of the first chain plates is formed with a connecting hole that has a first hole portion, a second hole portion, and a neck portion located between the first and second hole portions. The assembling pin is inserted through the connecting hole of each of the first chain plates, and is prevented from moving past the neck portions of the first chain plates so as to be positioned in the second hole portions of the first chain plates.

30 Claims, 16 Drawing Sheets

(56) References Cited

U.S. PATENT DOCUMENTS

| | | | | |
|---|---|---|---|---|
| 781,741 A * | 2/1905 | Rogers | F16G 13/02 | 474/219 |
| 818,469 A * | 4/1906 | Rogers | F16G 13/06 | 474/227 |
| 826,991 A * | 7/1906 | Christ | B65G 19/10 | 198/728 |
| 891,189 A * | 6/1908 | Schmidt, Jr. | F16G 13/06 | 305/59 |
| 1,109,808 A * | 9/1914 | Wilmot | F16G 13/02 | 411/549 |
| 1,326,171 A * | 12/1919 | Berry | F16G 13/02 | 474/227 |
| 1,372,689 A * | 3/1921 | Helwig | B65G 17/38 | 474/227 |
| 1,397,131 A * | 11/1921 | Law | B65G 17/38 | 474/227 |
| 1,453,088 A * | 4/1923 | Bachman | F16G 13/02 | 474/227 |
| 1,557,172 A * | 10/1925 | Klein | B65G 17/38 | 474/227 |
| 1,568,116 A * | 1/1926 | Webb | F16G 13/07 | 254/DIG. 6 |
| 1,570,440 A * | 1/1926 | Holmes | F16G 13/06 | 474/218 |
| 1,589,201 A * | 6/1926 | Meier | F16G 13/02 | 474/227 |
| 1,602,927 A * | 10/1926 | O'Neil | F16G 13/02 | 474/227 |
| 1,694,746 A * | 12/1928 | Landahl | B65G 17/385 | 198/851 |
| 1,808,236 A * | 6/1931 | Lerner | F16G 13/02 | 474/219 |
| 2,546,368 A * | 3/1951 | McIntosh | F16G 13/06 | 474/227 |
| 2,568,650 A * | 9/1951 | McIntosh | F16G 13/06 | 474/227 |
| 2,631,465 A * | 3/1953 | Cordis | A01K 1/0128 | 198/731 |
| 2,638,009 A * | 5/1953 | Beveridge | F16G 13/02 | 474/227 |
| 2,687,651 A * | 8/1954 | Webb | F16G 13/07 | 474/227 |
| 3,334,726 A * | 8/1967 | Fredriksons | B65G 17/086 | 198/852 |
| 3,344,677 A | 10/1967 | Morse | | |
| 3,665,704 A * | 5/1972 | Trudeau | F16G 13/07 | 198/717 |
| 3,754,477 A | 8/1973 | Bonifas | | |
| 4,041,790 A * | 8/1977 | Paul | F16G 13/06 | 474/220 |
| 4,043,215 A * | 8/1977 | Long | F16G 13/06 | 474/218 |
| 4,863,418 A * | 9/1989 | Fillar | F16G 13/02 | 474/207 |
| 4,895,248 A * | 1/1990 | Wahren | B65G 17/086 | 198/852 |
| 5,178,585 A * | 1/1993 | Lin | F16G 13/06 | 474/206 |
| 5,186,569 A * | 2/1993 | Wu | F16G 13/06 | 403/154 |
| 5,291,730 A * | 3/1994 | Wu | F16G 15/00 | 474/220 |
| 5,299,416 A * | 4/1994 | Wu | F16G 15/02 | 474/218 |
| 5,305,594 A * | 4/1994 | Wang | F16G 15/02 | 474/206 |
| 5,362,282 A * | 11/1994 | Lickton | F16G 15/02 | 474/220 |
| 5,400,585 A * | 3/1995 | Wang | F16G 13/06 | 474/206 |
| 5,966,923 A * | 10/1999 | Nakamura | B65G 17/38 | 198/851 |
| 6,110,064 A * | 8/2000 | Guichard | F16G 13/06 | 474/230 |
| 6,244,032 B1 * | 6/2001 | Christmas | F16G 13/06 | 474/220 |
| 6,390,943 B1 * | 5/2002 | Dreger | F16G 13/06 | 474/220 |
| 7,131,258 B2 * | 11/2006 | Meggiolan | F16G 13/06 | 474/206 |
| 7,427,251 B2 * | 9/2008 | Reiter | F16G 13/06 | 474/206 |
| 7,543,437 B1 * | 6/2009 | Chin | F16G 13/06 | 474/218 |
| 7,712,298 B1 * | 5/2010 | Wang | F16G 15/14 | 474/218 |
| 7,722,492 B2 * | 5/2010 | Santos | F16G 15/00 | 474/206 |
| 7,837,584 B2 * | 11/2010 | Wu | F16G 13/06 | 474/218 |
| 7,914,410 B2 * | 3/2011 | Oishi | F16G 13/06 | 474/220 |
| 8,540,597 B2 * | 9/2013 | Wang | F16G 13/06 | 403/118 |
| 9,341,237 B2 * | 5/2016 | Kubota | F16G 15/04 | |
| 9,494,216 B2 * | 11/2016 | Fukumori | F16G 15/04 | |
| 2002/0173395 A1 * | 11/2002 | Reiter | F16G 13/06 | 474/231 |
| 2007/0197333 A1 * | 8/2007 | Santos | F16G 15/00 | 474/227 |
| 2007/0249448 A1 * | 10/2007 | Wu | F16G 15/00 | 474/206 |
| 2007/0249449 A1 * | 10/2007 | Wu | F16G 13/02 | 474/206 |
| 2008/0081720 A1 * | 4/2008 | Oishi | F16G 13/06 | 474/227 |
| 2009/0247339 A1 * | 10/2009 | Chin | F16G 13/06 | 474/206 |
| 2011/0028255 A1 * | 2/2011 | Chin | F16G 13/06 | 474/227 |
| 2011/0081195 A1 * | 4/2011 | Wang | F16G 13/06 | 403/154 |
| 2015/0260258 A1 * | 9/2015 | Kubota | F16G 13/06 | 474/227 |
| 2015/0260260 A1 * | 9/2015 | Fukumori | F16G 13/06 | 474/227 |

\* cited by examiner

LINK UNIT AND LINK ASSEMBLY HAVING THE SAME

CROSS-REFERENCE TO RELATED APPLICATION

This application claims priority of Taiwanese Application No. 103143480, filed on Dec. 12, 2014.

FIELD

The disclosure relates to a link unit of a chain, and more particularly to a link unit of a chain that is easy to be reassembled.

BACKGROUND

A conventional chain includes chain plates, rollers, bushes and chain pins. Generally, the components of the conventional chain are assembled in the factory, and are difficult to be reassembled by an end-user. For example, two end portions of each of the chain pins are riveted by a riveting machine in the factory for holding two corresponding pairs of chain plates together. It is difficult for the end-user to reassemble the chain pins and the chain plates without the riveting machine.

SUMMARY

Therefore, an object of the disclosure is to provide a link unit that can overcome the aforesaid drawback associated with the prior art.

According to the disclosure, the link unit includes two spaced-apart first chain plates and an assembling pin. Each of the first chain plates has a first inner end section, a first outer end section that is misaligned from the first inner end section, an inner side surface that faces the other one of the first plates, and an outer side surface that is opposite to the inner side surface. The first outer end section of each of the first chain plates is formed with a connecting hole that has a first hole portion, a second hole portion, and a neck portion located between the first and second hole portions. The assembling pin is inserted removably through the connecting hole of each of the first chain plates, and is capable of being prevented from moving past the neck portion of each of the first chain plates so as to be positioned in the second hole portion of each of the first chain plates.

Another object of the disclosure is to provide a link assembly that can overcome the aforesaid drawback associated with the prior art.

According to the disclosure, the link assembly includes two link units. Each of the link unit includes two spaced-apart first chain plates and an assembling pin. Each of the first chain plates has a first inner end section, a first outer end section that is misaligned from the first inner end section, an inner side surface that faces the other one of the first plates, and an outer side surface that is opposite to the inner side surface. The first outer end section of each of the first chain plates is formed with a connecting hole that has a first hole portion, a second hole portion, and a neck portion located between the first and second hole portions. The assembling pin is inserted removably through the connecting hole of each of the first chain plates, and is capable of being prevented from moving past the neck portion of each of the first chain plates so as to be positioned in the second hole portion of each of the first chain plates.

BRIEF DESCRIPTION OF THE DRAWINGS

Other features and advantages of the disclosure will become apparent in the following detailed description of the embodiments with reference to the accompanying drawings, of which.

Figure 1:
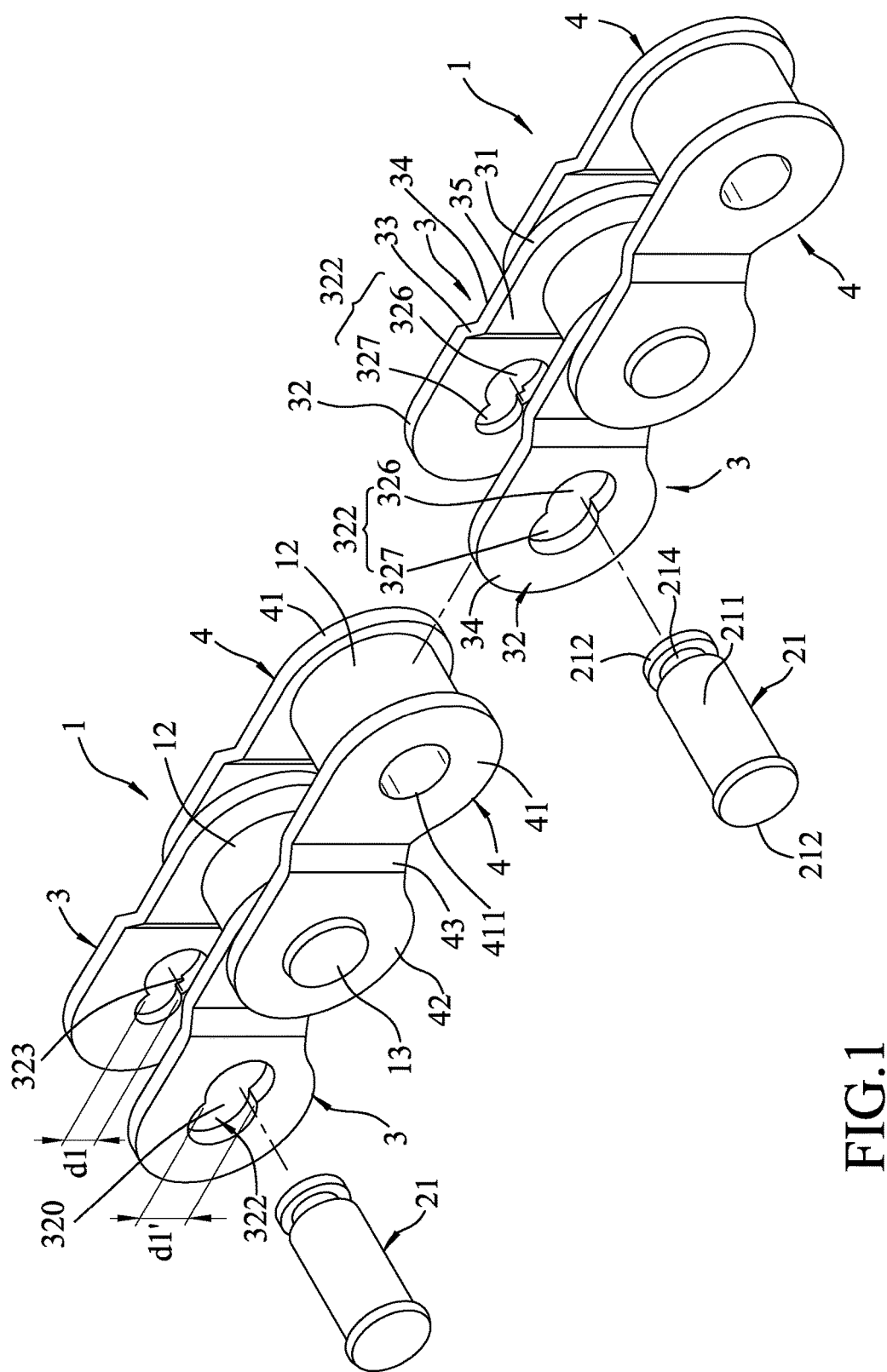
FIG. 1 is a partly exploded perspective view of a chain including two first embodiments of the link unit according to the disclosure.
Figure 4:
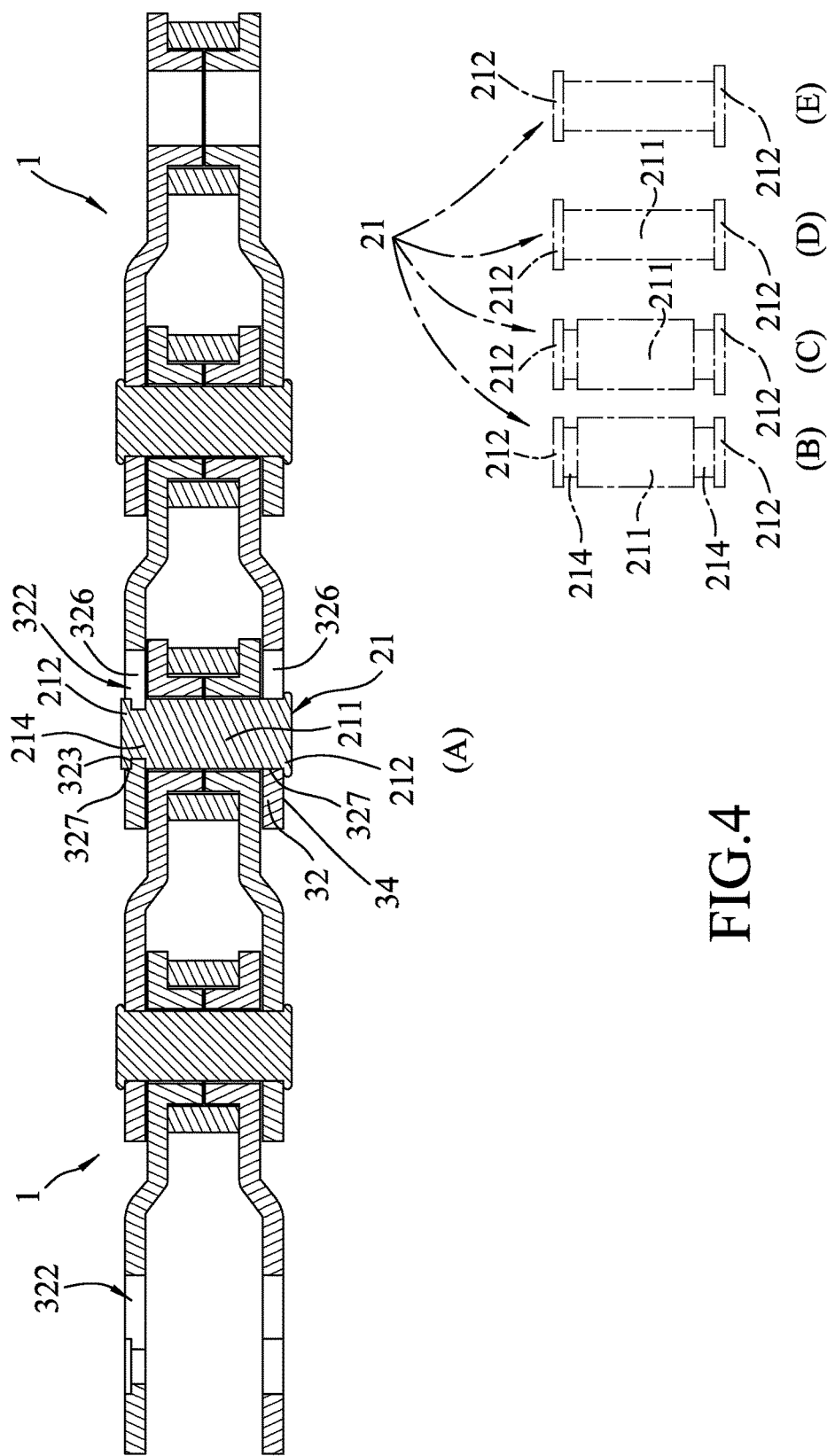
Figure 5:
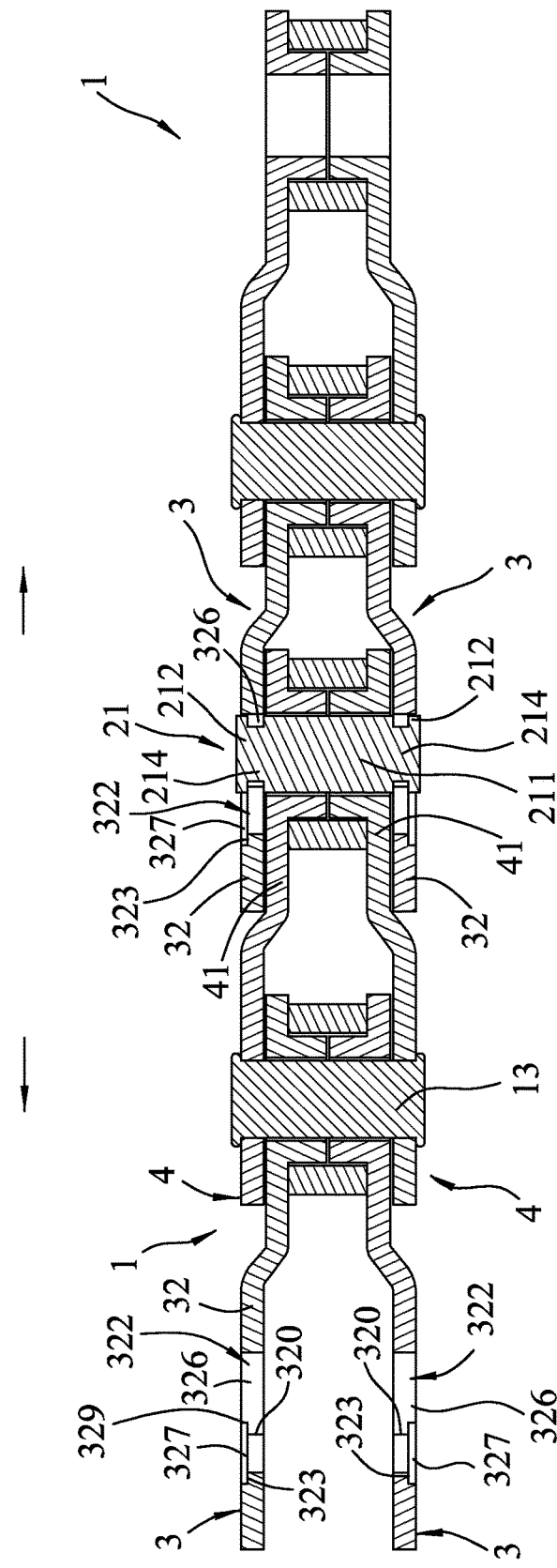
Figure 6:
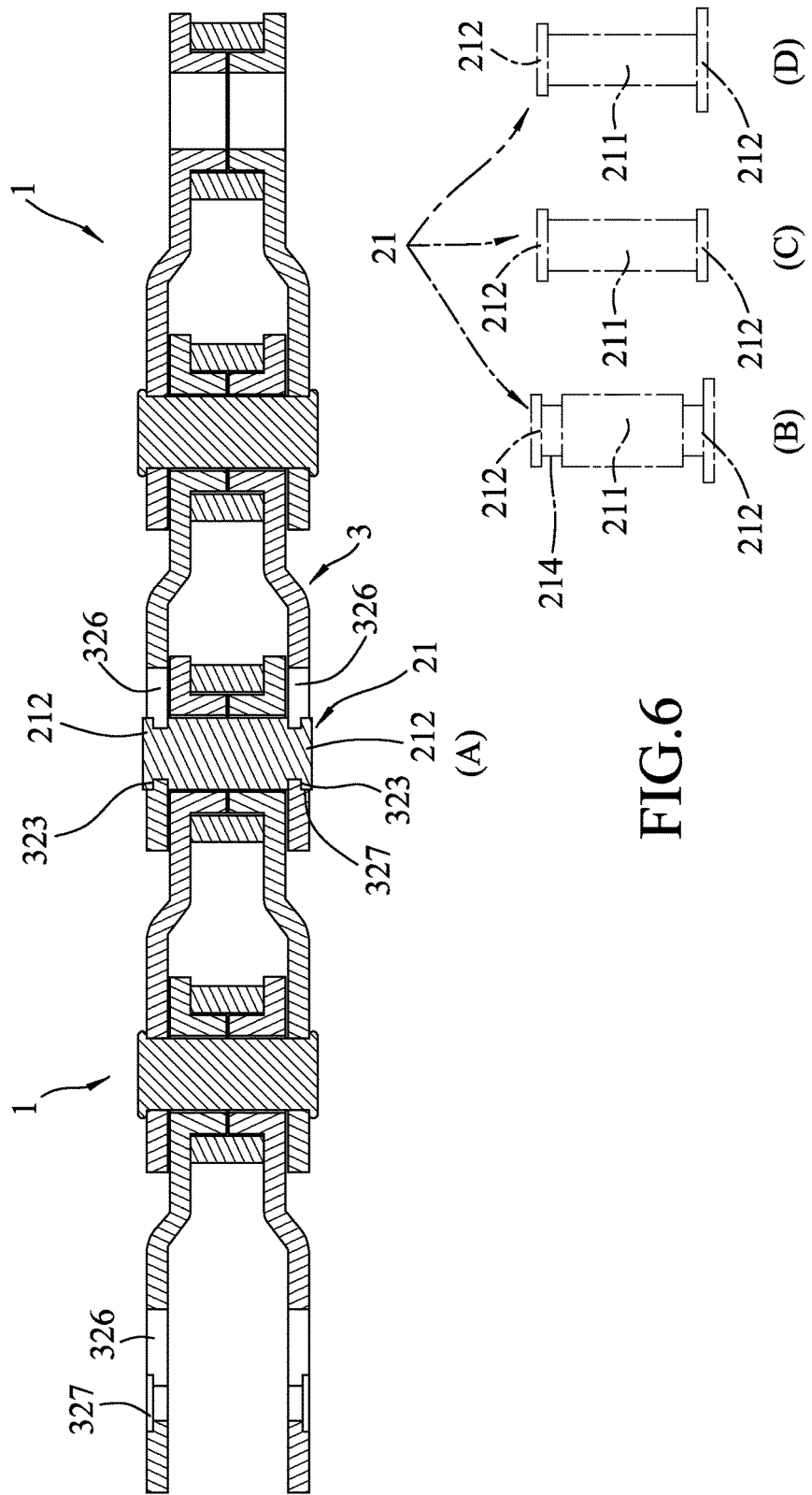
Figure 7:
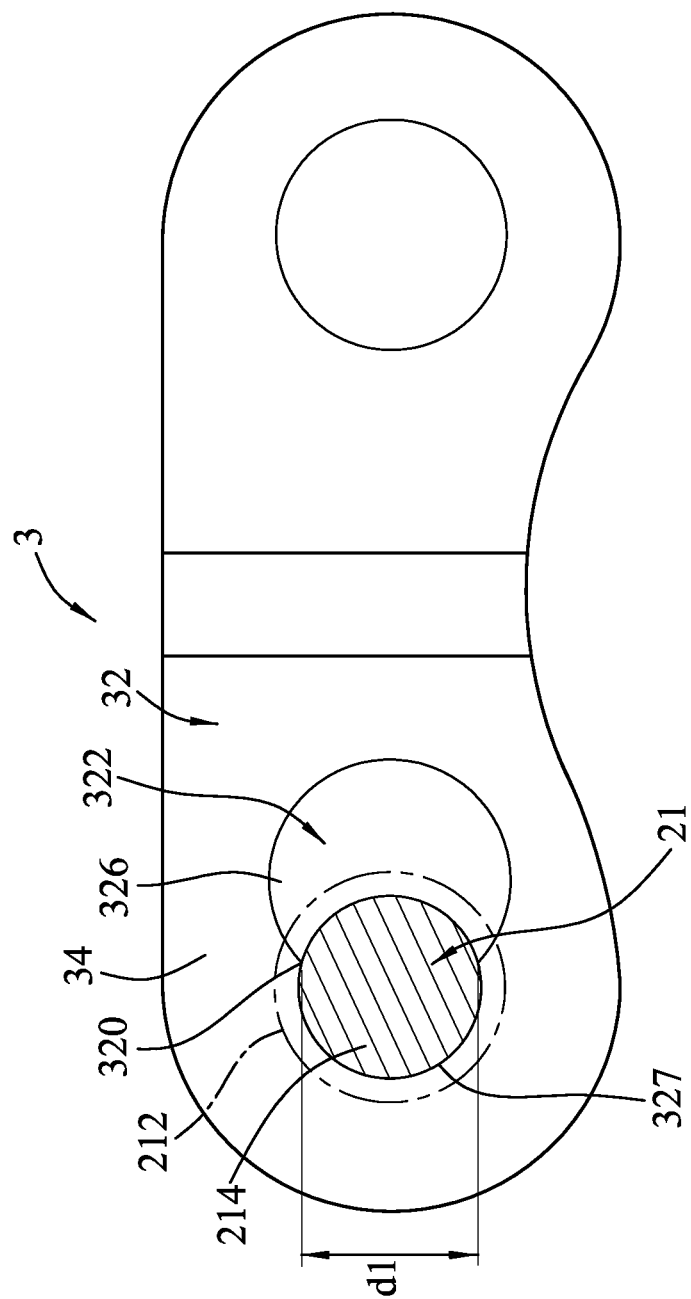
Figure 8:
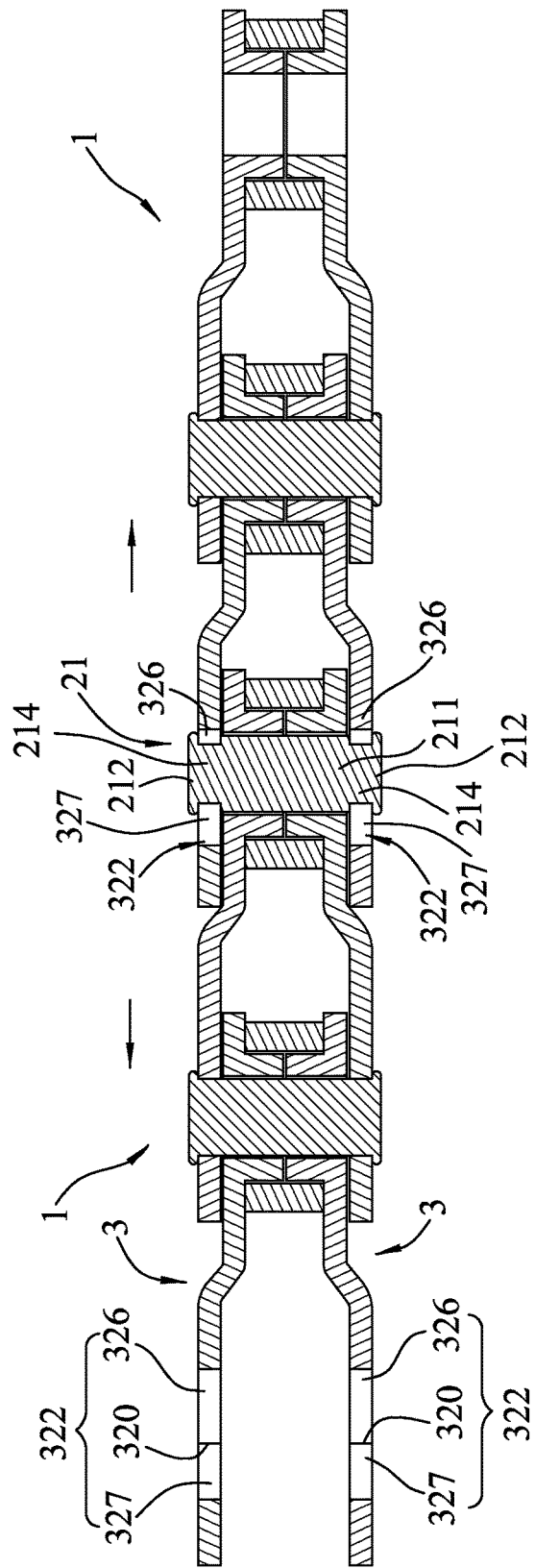
Figure 9:
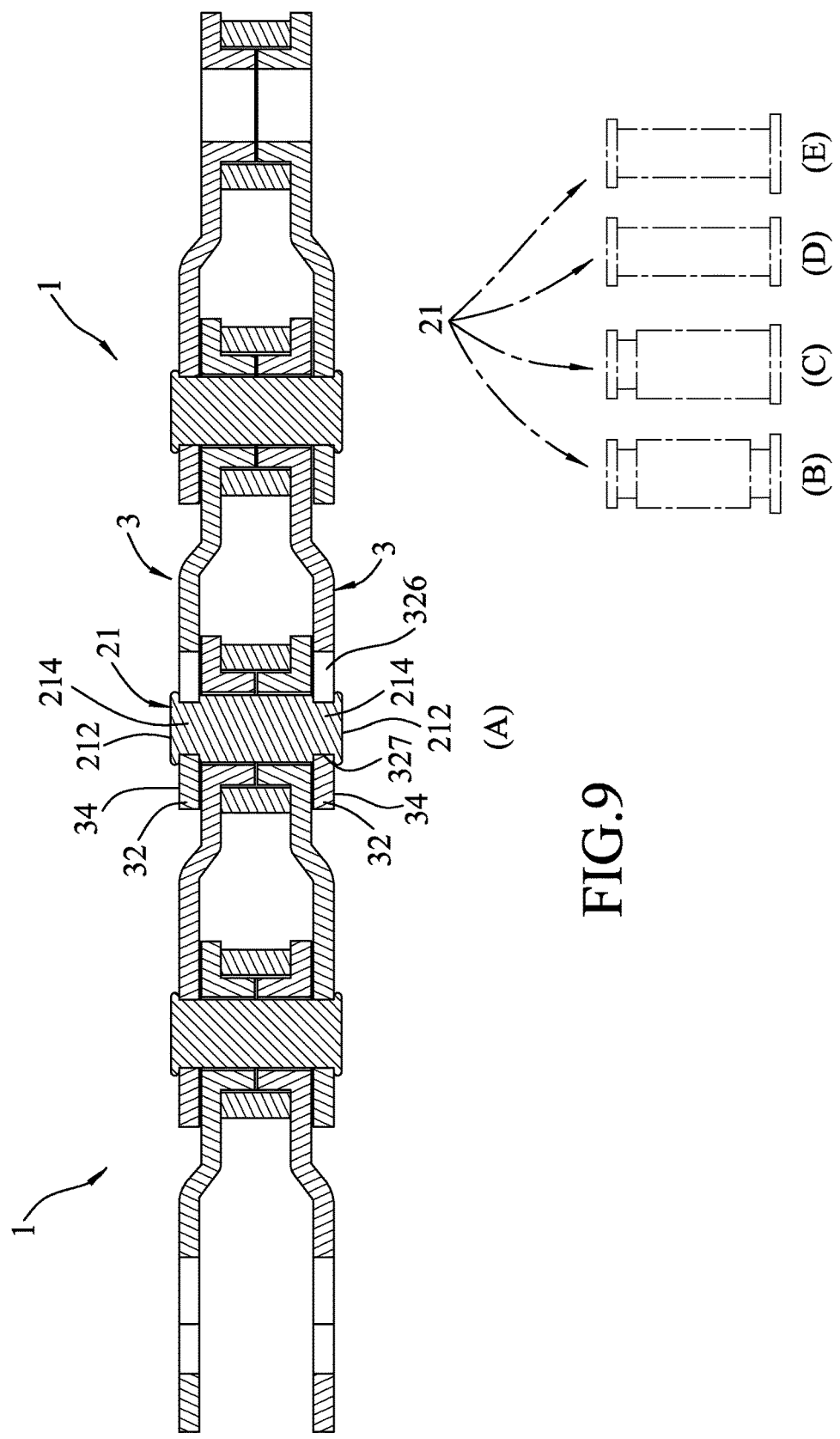
Figure 10:
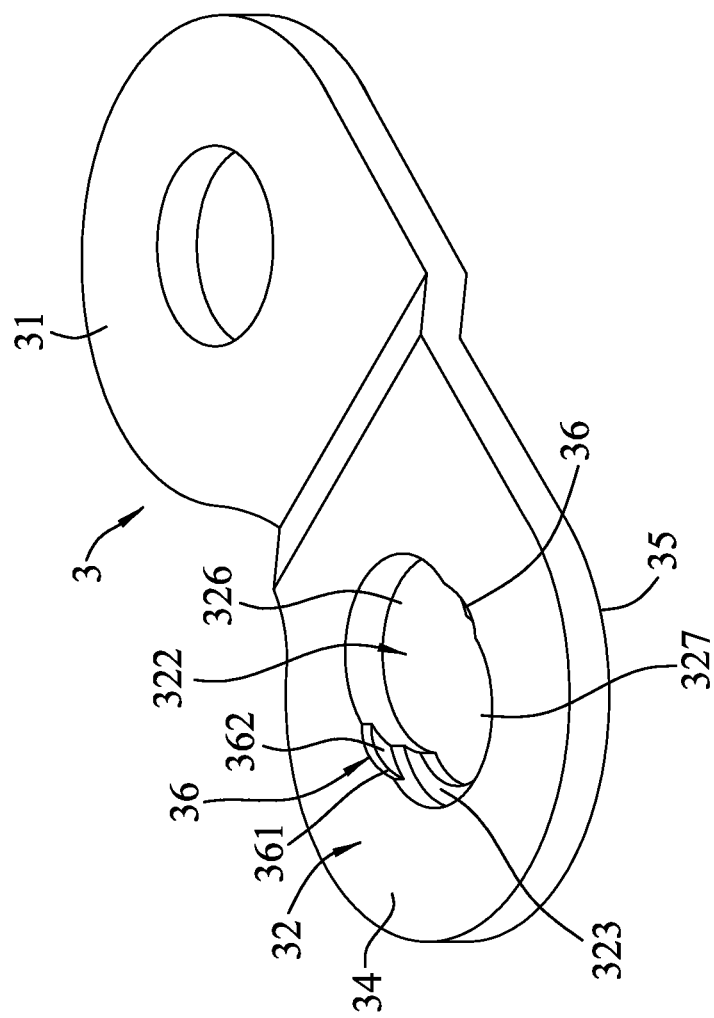
Figure 11:
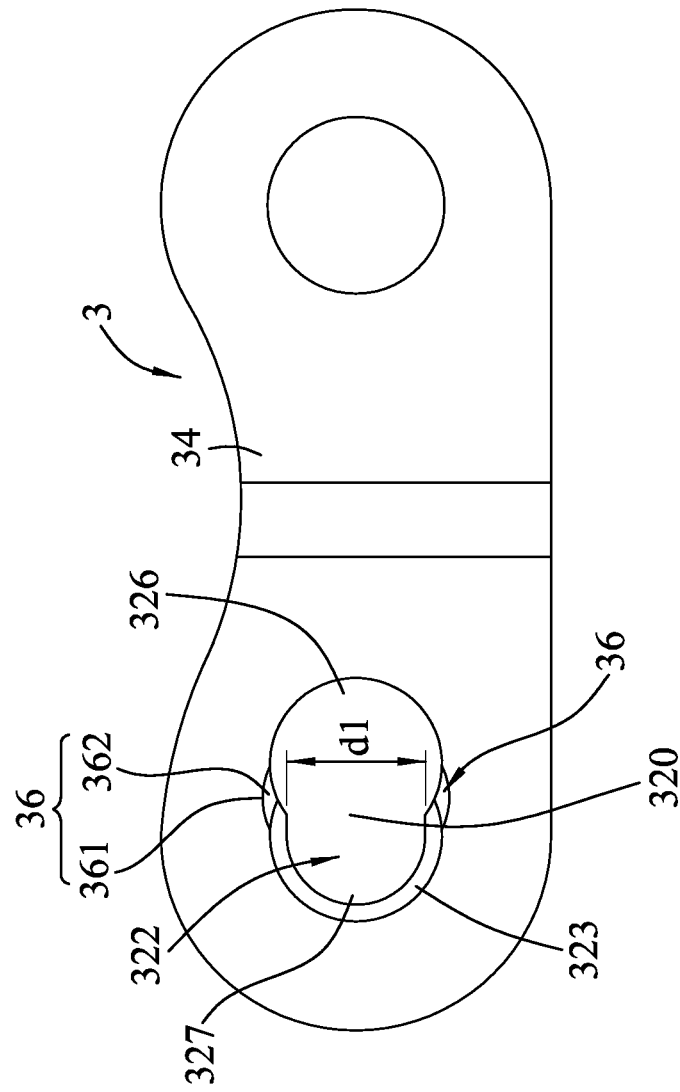
Figure 12:
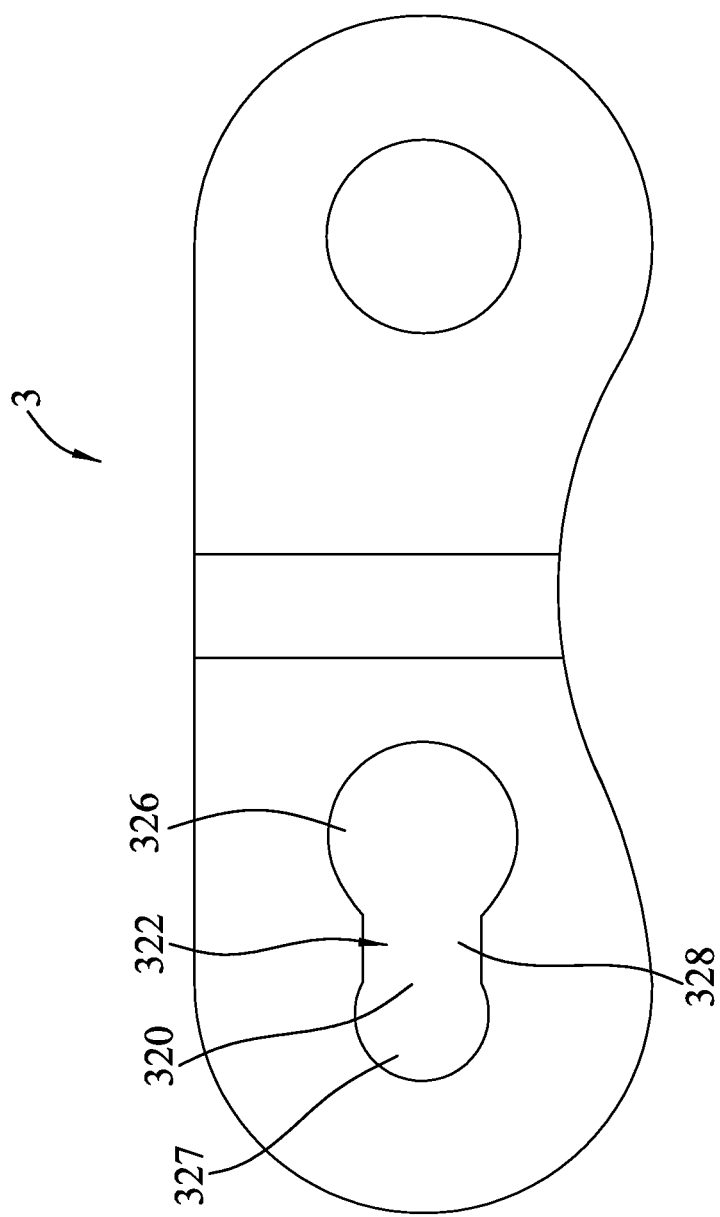
Figure 13:
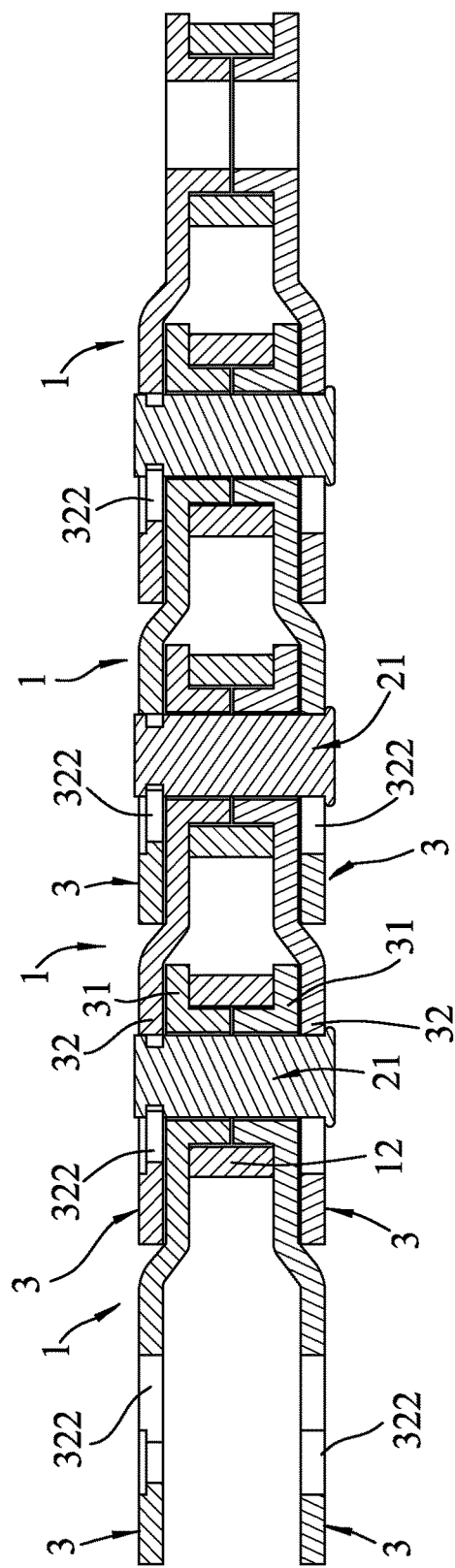
Figure 14:
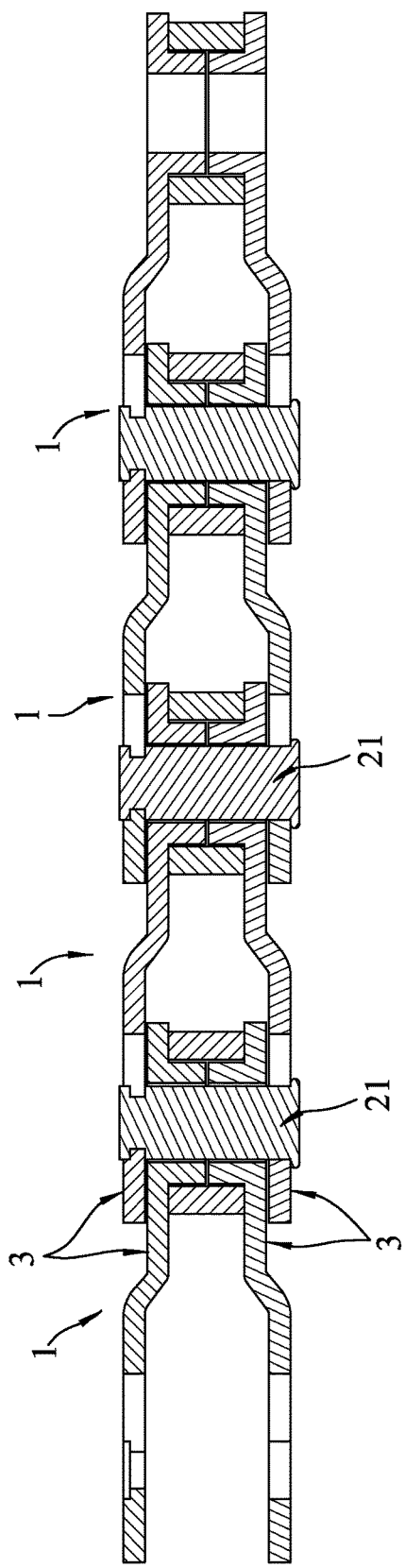
Figure 15:
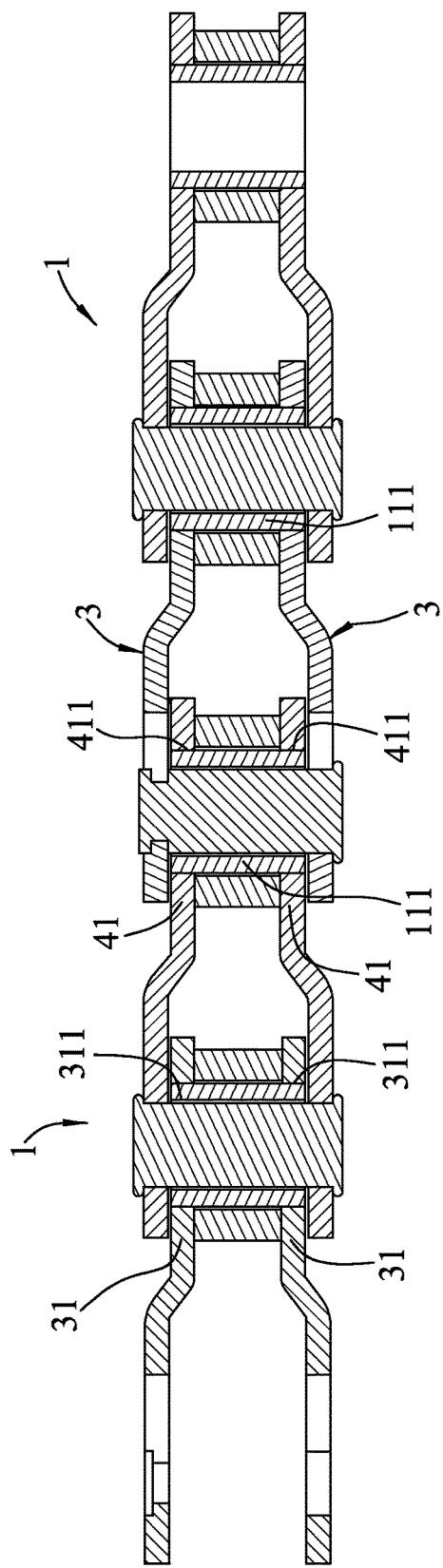
Figure 16:
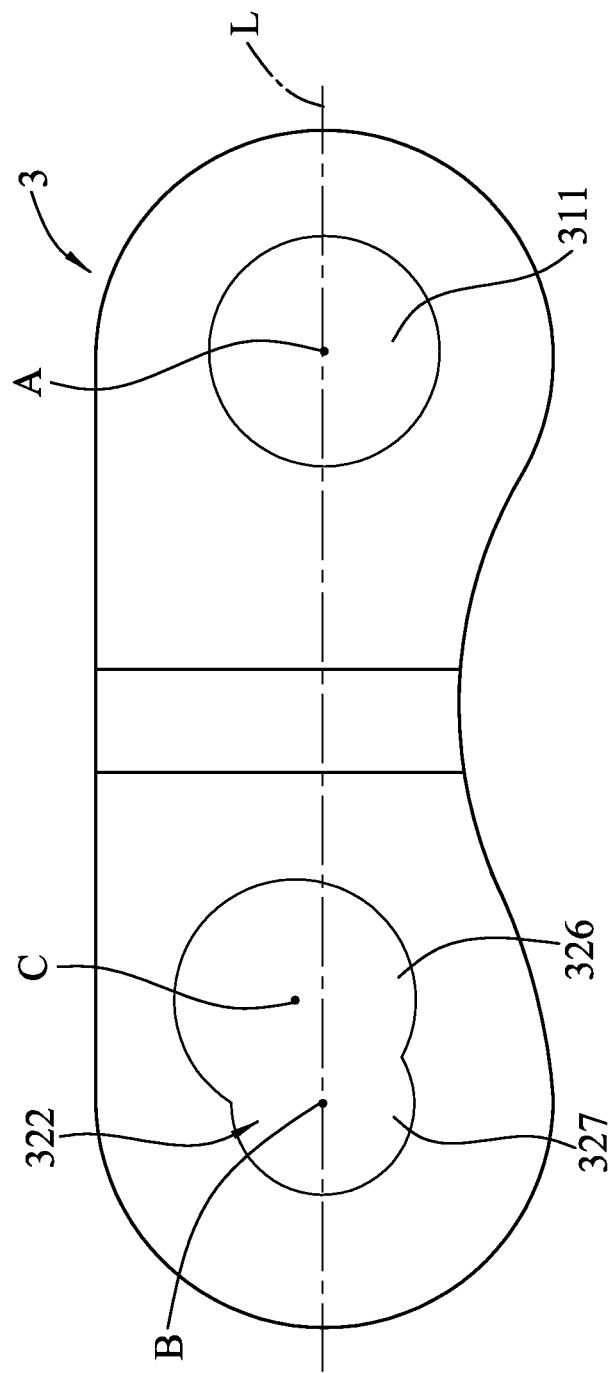

Part (A) of FIG. 4 is an assembled sectional view of the chain in FIG. 1;

Parts (B) to (E) of FIG. 4 illustrate four variations of an assembling pin of the first embodiment;

FIG. 5 is a schematic sectional view of a chain including two second embodiments of the link unit according to the disclosure, illustrating an assembling process of the chain;

Part (A) of FIG. 6 is an assembled sectional view of the chain in FIG. 5;

Parts (B) to (D) of FIG. 6 illustrate three variations of an assembling pin of the second embodiment;

FIG. 7 is an assembled sectional view of an assembling pin and a first chain plate of a third embodiment of the link unit according to the disclosure;

FIG. 8 is a schematic sectional view of a chain including two third embodiments, illustrating an assembling process of the chain;

Part (A) of FIG. 9 is an assembled sectional view of the chain in FIG. 8;

Parts (B) to (E) of FIG. 9 illustrate four variations of the assembling pin of the third embodiment;

FIG. 10 is a perspective view of a first chain plate of a fourth embodiment of the link unit according to the disclosure;

FIG. 11 is a side view of the first chain plate of the fourth embodiment;

FIG. 12 is a side view of a first chain plate of a fifth embodiment of the link unit according to the disclosure;

FIG. 13 is a schematic sectional view of a chain including a plurality of sixth embodiments of the link unit according to the disclosure, illustrating an assembling process of the chain;

FIG. 14 is an assembled sectional view of the chain in FIG. 13;

FIG. 15 is an assembled sectional view of a chain including two seventh embodiments of the link unit according to the disclosure; and FIG. 16 is a side view of a first chain plate of an eighth embodiment of the link unit according to the disclosure.

DETAILED DESCRIPTION

Before the disclosure is described in greater detail, it should be noted that like elements are denoted by the same reference numerals throughout the disclosure.

Referring to FIGS. 1 to 4, a chain is shown to include two first embodiments of the link unit 1 according to the disclosure. The first embodiment of the link unit 1 includes two spaced-apart first chain plates 3, two spaced-apart second chain plates 4, two roller members 12, a connecting pin 13 and an assembling pin 21.

Each of the first chain plates 3 has a first inner end section 31, a first outer end section 32 that is misaligned from the first inner end section 31, a first connecting section 33 that is connected between the first inner end section 31 and the first outer end section 32, an inner side surface 35 that faces the other one of the first plates 3, and an outer side surface 34 that is opposite to the inner side surface 35. The first inner end section 31 of each of the first chain plates 3 has a first through hole 311 that is formed through the inner and outer side surfaces 35, 34 of the first chain plate 31, an annular flange 312 that surrounds the first through hole 311 and that extends toward the first inner end section 31 of the other one of the first chain plates 3.

The first outer end section 32 of each of the first chain plates 3 is formed with a connecting hole 322 that has a first hole portion 326, a second hole portion 327, and a neck portion 320 located between the first and second hole portions 326, 327. With particular reference to FIG. 1, the width of the neck portion 320 of the connecting hole 322 of one of the first chain plates 3 is d1. The width of the neck portion 320 of the connecting hole 322 of the other one of the first chain plates 3 is d1' In this embodiment, d1' is greater than d1. The first and second hole portions 326, 327 of each of the first chain plates 3 are aligned respectively with the first and second hole portions 326, 327 of the other one of the first chain plates 3.

Figure 2:
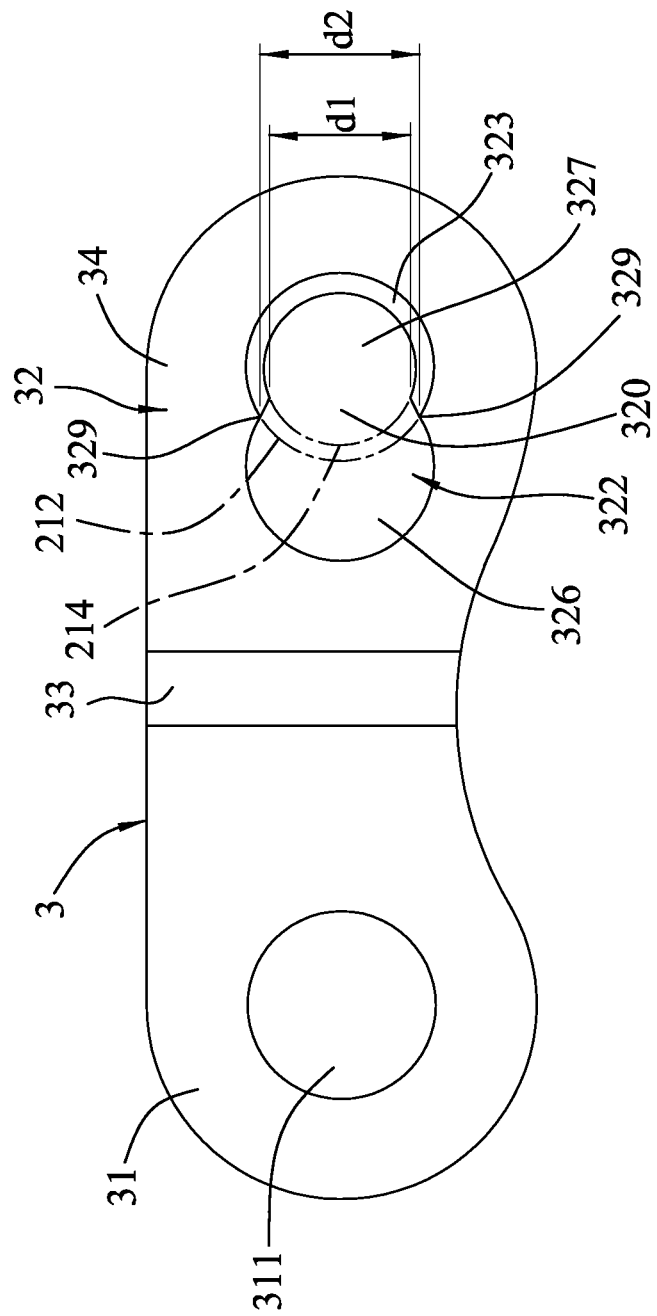
FIG. 2 is a side view of a first chain plate of the first embodiment.

With particular reference to FIG. 2, the one of the first chain plates 3 further has an abutment surface 323 that is recessed from the outer side surface 34 thereof and that extends around the second hole portion 327 thereof, and two limiting surfaces 329 that are connected respectively to two intersections of the abutment surface 323 and the first hole portion 326. A distance between the limiting surfaces 329 is d2. In this embodiment, d2 is greater than d1.

For the connecting hole 322 of the one of the first chain plates 3, the first hole portion 326 has a diameter greater than that of the second hole portion 327. For the connecting hole 322 of the other one of the first chain plates 3, the first hole portion 326 has a diameter the same as that of the second hole portion 327.

Each of the second chain plates 4 has a second inner end section 41, a second outer end section 42 that is misaligned from the second inner end section 41, and a second connecting section 43 that is connected between the second inner end section 41 and the second outer end section 42. The first inner end sections 31 of the first chain plates 3 are disposed between the second outer end sections 42 of the second chain plates 4. The second inner end section 41 of each of the second chain plates 4 has a second through hole 411 that is formed therethrough, and an annular flange 412 that surrounds the second through hole 411 and that extends toward the second inner end section 41 of the other one of the second chain plates 4. The second outer end section 42 of each of the second chain plates 4 is formed with a connecting hole 421.

The roller members 12 are located between the first inner end sections 31 of the first chain plates 3 and between the second inner end sections 41 of the second chain plates 4. The connecting pin 13 is inserted through the first through holes 311 of the first inner end sections 31 of the first chain plates 3 and the connecting holes 421 of the second outer end sections 42 of the second chain plates 4. The connecting pin 13 has opposite end portion that hold the second chain plates 4 together by being riveted, or in other manners.

The assembling pin 21 extends through the connecting holes 322 of the first chain plates 3, and has a main pin body 211, a neck section 214 that is connected to a longitudinal end of the main pin body 211 and that has a diameter small than that of the main pin body 211, and two end sections 212 that are connected respectively to an end of the neck section 214 distal from the main pin body 211 and another longitudinal end of the main pin body 211 distal from the neck section 214. The neck section 214 is located within the connecting hole 322 of the one of the first chain plates 3 that has the abutment surface 323, and has a diameter greater than the width (d1) of the neck portion 320 of the connecting hole 322 of the one of the first chain plates 3. The first hole portion 326 of the connecting hole 322 of each of the first chain plates 3 has a diameter greater than that of the main pin body 211 of the assembling pin 21 and that of the end section 212 of the assembling pin 21 connected to the neck section 214 for permitting the main pin body 211 and the end section 212 of the assembling pin 21 to be inserted therethrough. The diameter of the end section 212 of the assembling pin 21 connected to the neck section 214 is greater than the distance (d2) between the limiting surfaces 329, and is greater than the diameter of the second hole portion 327 of the one of the first chain plates 3. The diameter of the end section 212 of the assembling pin 21 distal from the neck section 214 is greater than the diameter of the second hole portion 327 of the other one of the first chain plates 3, is greater than the diameter of the main pin body 211, and is greater than the diameter of the first hole portion 326 of the connecting hole 322 of each of the first chain plates 3.

The first chain plates 3, the second chain plates 4, the roller members 12 and connecting pin 13 of the link unit 1 are assembled in advance. To interconnect two link units 1 of this disclosure, the second inner end sections 41 of the second chain plates 4 of one of the link units 1 are first disposed between the first outer end sections 32 of the first chain plates 3 of the other one of the link units 1. Then, the assembling pin 21 is inserted through the first hole portion 326 of the connecting hole 322 of each of the first chain plates 3 of the other one of the link units 1, the second through hole 411 and the annular flange 412 of each of the second chain plates 4 of the one of the link units 1 such that the neck section 214 of the assembling pin 21 is retained within the first hole portion 326 of the one of the first chain plates 3 of the other one of the link units 1 that has the abutment surface 323 (see FIG. 3). Finally, the link units 1 are pulled away from each other (see the arrows in FIG. 3) such that the neck section 214 of the assembling pin 21 is squeezed past the neck portion 320 of the one of the first chain plates 3 of the other one of the link units 1 and into the corresponding second hole portion 327, an end of the main pin body 211 of the assembling pin 21 distal from the neck section 214 is squeezed past the neck portion 320 of the other one of the first chain plates 3 of the other one of the link units 1 and into the corresponding second hole portion 327, the end section 212 of the assembling pin 21 connected to the neck section 214 abuts against the abutment surface 323 of the one of the first chain plates 3 of the other one of the link units 1, and the end section 212 of the assembling pin 21 distal from the neck section 214 abuts against the outer side surface 34 of the other one of the first chain plates 3 of the other one of the link units 1.

After the assembly of the link units 1, the end of the main pin body 211 of the assembling pin 21 distal from the neck section 214 is prevented from moving past the neck portion 320 of the other one of the first chain plates 3 of the other one of the link units 1 so as to be positioned in the corresponding second hole portion 327, the end section 212 of the assembling pin 21 connected to the neck section 214 is prevented from moving past the limiting surfaces 329 of the one of the first chain plates 3 of the other one of the link units 1 so as to be positioned in the corresponding second hole portion 327, and the neck section 214 of the assembling pin 21 is prevented from moving past the neck portion 320 of the one of the first chain plates 3 of the other one of the link units 1 so as to be positioned in the corresponding second hole portion 327. In a variation of the first embodiment, the one of the first chain plates 3 may have only one limiting surface 329, and the neck section 320 may have a different configuration as long as the assembling pin 21 is positioned in the second hole portion 327 of each of the first chain plates 3.

It should be noted that the first chain plates 3, the second chain plates 4, the roller members 12 and connecting pin 13 of the link unit 1 are assembled by the provider/seller in advance, so that an end-user can easily assemble or disassemble a plurality of the link units 1 of this disclosure. It is also easy to replace a broken portion of a chain consisting of the link units 1. Moreover, the link units 1 may have different colors so that the end-user is able to construct a personalized colorful chain.

The assembling pin 21 of the first embodiment has other variations respectively shown by imaginary lines in parts (B) to (E) of FIG. 4. The connecting hole 322 of each of the first chain plates 3 needs to be modified according to different variations of the assembling pin 21.

The assembling pin 21 shown in part (B) of FIG. 4 has a main pin body 211, two neck sections 214 each of which is connected to a respective one of two opposite longitudinal ends of the main pin body 211 and has a diameter smaller than that of the main pin body 211, and two end sections 212 each of which is connected to an end of a respective one of the neck sections 214 distal from the main pin body 211.

The assembling pin 21 shown in part (C) of FIG. 4 is similar to that shown in part (B) of FIG. 4. One of the end sections 212 has a diameter greater than that of the other one of the end sections 212, and greater than that of the first hole portion 326 of the connecting hole 322 of each of the first chain plates 3, such that the one of the end sections 212 is prevented from being inserted into the first hole portion 326 of the connecting hole 322 of each of the first chain plates 3 in order to facilitate the assembling process.

The assembling pin 21 shown in part (D) of FIG. 4 has a main pin body 211, and two diametrically-enlarged end sections 212 each of which is connected to a respective one of two opposite longitudinal ends of the main pin body 211.

The assembling pin 21 shown in part (E) of FIG. 4 is similar to that shown in part (D) of FIG. 4. One of the end sections 212 has a diameter greater than that of the other one of the end sections 212, and greater than that of the first hole portion 326 of the connecting hole 322 of each of the first chain plates 3.

To sum up, since the connecting hole 322 of each of the first chain plates 3 is aligned with the connecting hole 322 of the other one of the first chain plates 3 in an axial direction of the assembling pin 21, and since the connecting hole 322 of each of the first chain plates 3 has the neck portion 320 located between the first and second hole portions 326, 327 thereof, the assembling pin 21 is movable within the connecting hole 322 of each of the first chain plates 3, and can be positioned in the second hole portion 327 of each of the first chain plates 3. As a result, the link unit 1 of this disclosure is easy to be reassembled. Moreover, the end-user can easily construct a chain having personalized colors and length.

Referring to FIGS. 5 and 6, a second embodiment of the link unit 1 according to the disclosure is similar to the first embodiment. What is different is that each of the first chain plates 3 of the second embodiment has the abutment surface 323.

The assembling pin 21 has a main pin body 211, two neck sections 214 each of which is connected to a respective one of two opposite longitudinal ends of the main pin body 211 and has a diameter smaller than that of the main pin body 211, and two end sections 212 each of which is connected to an end of a respective one of the neck sections 214 distal from the main pin body 211 and has a diameter greater than that of the respective one of the neck sections 214. The diameter of each of the neck sections 214 is greater than the width (d2, see FIG. 2) of the neck portion 320 of a corresponding first chain plate 3. The end sections 212 of the assembling pin 21 respectively abut against the abutment surfaces 323 of the first chain plates 3. The first hole portion 326 of the connecting hole 322 of each of the first chain plates 3 has a diameter greater than that of the main pin body 211 of the assembling pin 21 and that of one of the end sections 212 of the assembling pin 21. The diameter of each of the end sections 212 is greater than the distance (d2, see FIG. 2) between the limiting surfaces 329 of the corresponding first chain plate 3, and is greater than that of the second hole portion 327 of the corresponding first chain plate 3.

The assembly of the second embodiment is similar to that of the first embodiment. The assembling pin 21 is first inserted through two adjacent link units 1, and then the link units 1 are pulled away from each other (see the arrows in FIG. 5) to position the assembling pin 21 within the second hole portions 327 of the corresponding link unit 1.

The assembling pin 21 of the second embodiment has three variations respectively shown by imaginary lines in parts (B) to (D) of FIG. 6.

One of the end sections 212 of the variation of the assembling pin 21 shown in part (B) of FIG. 6 has a diameter greater than that of the other one of the end sections 212, and greater than that of the first hole portion 326 of the connecting hole 322 of each of the first chain plates 3. The abutment surface 323 of one of the first chain plates 3 that abuts against the larger one of the end sections 212 is enlarged correspondingly.

The variation of the assembling pin 21 shown in part (C) of FIG. 6 has a main pin body 211, and two diametrically-enlarged end sections 212 each of which is connected to a respective one of two opposite longitudinal ends of the main pin body 211. The end sections 212 respectively abut against the abutment surfaces 323 of the first chain plates 3

The variation of the assembling pin 21 shown in part (D) of FIG. 6 is similar to the variation shown in part (C) of FIG. 6. One of the end sections 212 has a diameter greater than that of the other one of the end sections 212.

Referring to FIGS. 7 to 9, a third embodiment of the link unit 1 according to the disclosure is similar to the first embodiment. What is different is that each of the first chain plates 3 of the third embodiment is not provided with the abutment surface 323 (see FIG. 3).

The assembly of the third embodiment is similar to that of the first embodiment. The assembling pin 21 is first inserted through two adjacent link units 1, and then the link units 1 are pulled away from each other (see the arrows in FIG. 8) to respectively position the neck sections 214 of the assembling pin 21 within the second hole portions 327 of the corresponding link unit 1. The end sections 212 of the assembling pin 21 respectively abut against the outer side surfaces 34 of the first chain plates 3 after the assembly of the third embodiment.

The assembling pin 21 of the third embodiment has four variations shown by imaginary lines in parts (B) to (E) of FIG. 9. The variations of the assembling pin 21 are similar to those of the first embodiment, and will not be further illustrated.

Referring to FIGS. 10 and 11, a fourth embodiment of the link unit 1 according to the disclosure is similar to the first embodiment. The one of the first chain plates 3 that has the abutment surface 323 further two spaced-apart recesses 36 each of which is connected between the first and second hole portions 326, 327 and has a connecting surface 361 and a slide surface 362. The slide surface 362 of each of the recesses 26 is recessed from and parallel to the outer side surface 34. The connecting surface 361 of each of the recesses 36 is arc-shaped, is connected between the first and second hole portions 326, 327, and extends from the outer side surface 34 to the corresponding slide surface 362. A distance between the outer side surface 34 of the one of the first chain plates 3 and the slide surface 362 of each of the recesses 36 is smaller than that between the outer side surface 34 and the abutment surface 323. In this embodiment, the width (d1) of the neck portion 320 of the connecting hole 322 of the one of the first chain plates 3 is greater than the diameter of the neck section 214 (see FIG. 4) of the assembling pin 21, such that the neck section 214 can be easily moved into the second hole portion 327.

In the assembly of the fourth embodiment, the recesses 36 are configured to permit the end section 212 of the assembling pin 21 to pass therethrough. Therefore, the assembling pin 21 can be moved into the second hole portion 327 when an inner end surface of the end section 212 that faces toward the main pin body 211 is located outside of the slide surface 362 of each of the recesses 36. Since the inner end surface of the end section 212 needs not be located outside of the outer side surface 34 to permit the assembling pin 21 to be moved into the second hole portion 327, the length of the assembling pin 21 can be reduced.

FIG. 12 illustrates a fifth embodiment of the link unit 1 according to the disclosure. The connecting hole 322 of each of the first chain plates 3 further has an intermediate hole portion 328 that is connected between the neck portion 320 and the first hole portion 326.

Referring to FIGS. 13 and 14, a sixth embodiment of the link unit 1 according to the disclosure includes two first chain plates 3, a roller member 12 and an assembling pin 21. The components of the sixth embodiment are configured to be the same as the corresponding components of the first embodiment. The first inner end sections 31 of the first chain plates 3 of each of the link units 1 are disposed between the first outer end sections 32 of the first chain plates 3 of an adjacent link unit 1.

Figure 3:
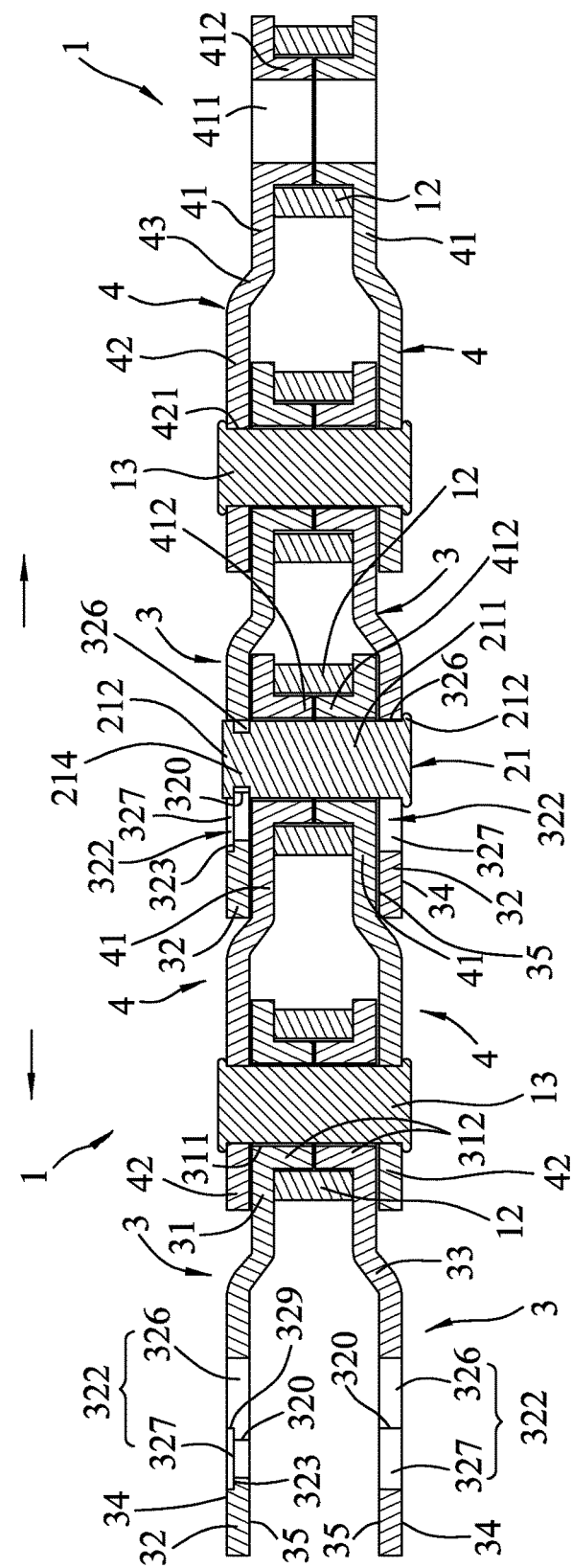
FIG. 3 is a schematic sectional view of the chain in FIG. 1 illustrating an assembling process of the chain.

Referring to FIG. 15, a seventh embodiment of the link unit 1 according to the disclosure further includes two bush members 111 for substituting the annular flanges 312 of the first chain plates 3 and the annular flanges 412 of the second chain plates 4 (see FIG. 3). One of the bush members 111 is press-fitted into the first through holes 311 of the first chain plates 3. The other one of the bush members 111 is press-fitted into the second through holes 411 of the second chain plates 4.

FIG. 16 shows an eighth embodiment of the link unit 1 according to the disclosure. For each of the first chain plates 3, the center (A) of the through hole 311, the curvature center (C) of the first hole portion 326 and the curvature center (B) of the second hole portion 327 are not collinear. The curvature center (C) of the first hole portion 326 does not reside on an imaginary line (L) passing through the center (A) of the through hole 311 and the curvature center (B) of the second hole portion 327.

With further reference to FIG. 8, in assembly, the assembling pin 21 is moved into the second hole portion 327 in the direction of a line that passes through the curvature center (C) of the first hole portion 326 and the curvature center (B) of the second hole portion 327. In operation, the assembling pin 21 is subjected to a force that pushes the assembling pin 21 toward the center (A) of the through hole 311 in the direction of the imaginary line (L). Since the curvature center (C) of the first hole portion 326 does not reside on the imaginary line (L), the assembling pin 21 is not likely to be moved into the first hole portion 326, so as to enhance the steadiness of the link unit 1 of this disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A link unit comprising:
two spaced-apart first chain plates, each of said first chain plates having a first inner end section, a first outer end section that is misaligned from said first inner end section, an inner side surface that faces the other one of said first plates, and an outer side surface that is opposite to said inner side surface, said first outer end section of each of said first chain plates being formed with a connecting hole that has a first hole portion, a second hole portion, and a neck portion located between said first and second hole portions, said first inner end section of each of said first chain plates being formed with a first through hole that is configured as a circular hole; and
an assembling pin inserted removably through said connecting hole of each of said first chain plates, and capable of being prevented from moving past said neck portion of each of said first chain plates so as to be positioned in said second hole portion of each of said first chain plates;
wherein said first and second hole portions of each of said first chain plates are aligned respectively with said first and second hole portions of the other one of said first chain plates in an axial direction of said assembling pin, said first through hole of each of said first chain plates being aligned with said first through hole of the other one of said first chain plates in the axial direction of said assembling pin; and
wherein said link unit further comprises two spaced-apart second chain plates and a connecting pin, each of said second chain plates having a second inner end section, and a second outer end section that is misaligned from said second inner end section, said second outer end section of each of said second chain plates being formed with a connecting hole that is configured as a circular hole, said second inner end section of each of said second chain plates being formed with a second through hole that is configured as a circular hole, said first inner end sections of said first chain plate being disposed between said second outer end sections of said second chain plates, said connecting pin being inserted through said first through holes of said first inner end sections of said first chain plates and said connecting holes of said second outer end sections of said second chain plates, and having two opposite end portions that hold said second chain plates together.

2. The link unit as claimed in claim 1, further comprising a bush member connected between said first inner end sections of said first chain plates.

3. The link unit as claimed in claim 1, wherein said first inner end section of each of said first chain plates has an annular flange that extends toward said first inner end section of the other one of said first chain plates.

4. The link unit as claimed in claim 1, wherein one of said first chain plates further has an abutment surface that is recessed from said outer side surface of the one of said first chain plates and that extends around said second hole portion of the one of said first chain plates.

5. The link unit as claimed in claim 4, wherein said assembling pin has a main pin body, and two radially-enlarged end sections that are connected respectively to two opposite longitudinal ends of said main pin body, the one of said first chain plates further having at least one limiting surface that is connected to an circumferential end of said abutment surface and that abuts against one of said end sections of said assembling pin for positioning said assembling pin in said second hole portion thereof and preventing said assembling pin from moving into said first hole portion thereof.

6. The link unit as claimed in claim 4, wherein said assembling pin has a main pin body, a neck section that is connected to a longitudinal end of said main pin body and that has a diameter smaller than that of said main pin body, and two end sections that are connected respectively to an end of said neck section distal from said main pin body and another longitudinal end of said main pin body distal from said neck section, the one of said first chain plates further having at least one limiting surface that is connected to an circumferential end of said abutment surface and that abuts against one of said end sections of said assembling pin for positioning said assembling pin in said second hole portion thereof and preventing said assembling pin from moving into said first hole portion thereof, said neck portion of said connecting hole of the one of said first chain plates having a width greater than the diameter of said neck section of said assembling pin.

7. The link unit as claimed in claim 4, wherein at least one of said first chain plates is further formed with two recesses each of which is connected between said first and second hole portions and has a slide surface.

8. The link unit as claimed in claim 7, wherein the one of said first chain plates is formed with said recesses, a distance between said outer side surface of the one of said first chain plates and said slide surface of each of said recesses being smaller than that between said outer side surface and said abutment surface.

9. The link unit as claimed in claim 6, wherein at least one of said first chain plates is further formed with two recesses each of which is connected between said first and second hole portions and has a slide surface.

10. The link unit as claimed in claim 9, wherein the one of said first chain plates is formed with said recesses, a distance between said outer side surface of the one of said first chain plates and said slide surface of each of said recesses being smaller than that between said outer side surface and said abutment surface.

11. The link unit as claimed in claim 1, wherein said connecting hole of each of said first chain plates further has an intermediate hole portion that is located between said neck portion and said first hole portion.

12. The link unit as claimed in claim 1, wherein said assembling pin has a main pin body, and two radially-enlarged end sections that are connected respectively to two opposite longitudinal ends of said main pin body, said end sections of said assembling pin respectively abutting against said outer side surfaces of said first chain plates, said first hole portion of said connecting hole of each of said first chain plates having a diameter greater than that of said main pin body of said assembling pin and that of one of said end sections of said assembling pin, said neck portion of said connecting hole of each of said first chain plates having a width smaller than the diameter of said main pin body of said assembling pin and the diameter of one of said end sections of said assembling pin.

13. The link unit as claimed in claim 1, wherein said assembling pin has a main pin body, a neck section that is connected to a longitudinal end of said main pin body and that has a diameter smaller than that of said main pin body, and two end sections that are connected respectively to an end of said neck section distal from said main pin body and another longitudinal end of said main pin body distal from said neck section, said neck section of said assembling pin having a diameter greater than the width of said neck portion of said connecting hole of one of said first chain plates, said end sections of said assembling pin respectively abutting against said outer side surfaces of said first chain plates, said first hole portion of said connecting hole of each of said first chain plates having a diameter greater than that of said main pin body of said assembling pin and that of one of said end sections of said assembling pin.

14. The link unit as claimed in claim 1, wherein said assembling pin has a main pin body, two neck sections each of which is connected to a respective one of two opposite longitudinal ends of said main pin body and has a diameter smaller than that of said main pin body, and two end sections each of which is connected to an end of a respective one of said neck sections distal from said main pin body, each of said neck sections of said assembling pin having a diameter greater than the width of said neck portion of said connecting hole of each of said first chain plates, said end sections of said assembling pin respectively abutting against said outer side surfaces of said first chain plates, said first hole portion of said connecting hole of each of said first chain plates having a diameter greater than that of said main pin body of said assembling pin and that of one of said end sections of said assembling pin.

15. The link unit as claimed in claim 12, wherein the diameter of said first hole portion of said connecting hole of each of said first chain plates is smaller than that of the other one of said end sections of said assembling pin.

16. The link unit as claimed in claim 15, wherein the diameter of said first hole portion of said connecting hole of each of said first chain plates is smaller than that of the other one of said end sections of said assembling pin.

17. The link unit as claimed in claim 14, wherein the diameter of said first hole portion of said connecting hole of each of said first chain plates is smaller than that of the other one of said end sections of said assembling pin.

18. The link unit as claimed in claim 4, wherein said assembling pin has a main pin body, and two radially-enlarged end sections that are connected respectively to two opposite longitudinal ends of said main pin body, one of said end sections of said assembling pin abutting against said abutment surface of the one of said first chain plates, said first hole portion of said connecting hole of each of said first chain plates having a diameter greater than that of said main pin body of said assembling pin and that of one of said end sections of said assembling pin, said neck portion of said connecting hole of each of said first chain plates having a width smaller than the diameter of said main pin body of said assembling pin and the diameter of one of said end sections of said assembling pin, the diameter of each of said end sections of said assembling pin being greater than the diameter of said second hole portion of said connecting hole of each of said first chain plates.

19. The link unit as claimed in claim 4, wherein said assembling pin has a main pin body, a neck section that is connected to a longitudinal end of said main pin body and that has a diameter smaller than that of said main pin body, and two end sections that are connected respectively to an end of said neck section distal from said main pin body and another longitudinal end of said main pin body distal from said neck section, said neck section of said assembling pin having a diameter greater than the width of said neck portion of said connecting hole of one of said first chain plates, one of said end sections of said assembling pin abutting against said abutment surface of the one of said first chain plates, said first hole portion of said connecting hole of each of said first chain plates having a diameter greater than that of said main pin body of said assembling pin and that of one of said end sections of said assembling pin.

20. The link unit as claimed in claim 4, wherein said assembling pin has a main pin body, two neck sections each of which is connected to a respective one of two opposite longitudinal ends of said main pin body and has a diameter smaller than that of said main pin body, and two end sections each of which is connected to an end of a respective one of said neck sections distal from said main pin body, each of said neck sections of said assembling pin having a diameter greater than the width of said neck portion of said connecting hole of each of said first chain plates, one of said end sections of said assembling pin abutting against said abutment surface of the one of said first chain plates, said first hole portion of said connecting hole of each of said first chain plates having a diameter greater than that of said main pin body of said assembling pin and that of one of said end sections of said assembling pin.

21. The link unit as claimed in claim 18, wherein the diameter of said first hole portion of said connecting hole of each of said first chain plates is smaller than that of the other one of said end sections of said assembling pin.

22. The link unit as claimed in claim 19, wherein the diameter of said first hole portion of said connecting hole of each of said first chain plates is smaller than that of the other one of said end sections of said assembling pin.

23. The link unit as claimed in claim 20, wherein the diameter of said first hole portion of said connecting hole of each of said first chain plates is smaller than that of the other one of said end sections of said assembling pin.

24. The link unit as claimed in claim 1, wherein each of said first chain plates further has an abutment surface that is recessed from said outer side surface of said first chain plate and that extends around said second hole portion of said first chain plate.

25. The link unit as claimed in claim 24, wherein said assembling pin has a main pin body, and two radially-enlarged end sections that are connected respectively to two opposite longitudinal ends of said main pin body, said end sections of said assembling pin respectively abutting against said abutment surfaces of said first chain plates, each of said first chain plates further having at least one limiting surface that is connected to an circumferential end of said abutment surface thereof and that abuts against a respective one of said end sections of said assembling pin for positioning said assembling pin in said second hole portion thereof and preventing said assembling pin from moving into said first hole portion thereof.

26. The link unit as claimed in claim 24, wherein said assembling pin has a main pin body, two neck sections each of which is connected to a respective one of two opposite longitudinal ends of said main pin body and has a diameter smaller than that of said main pin body, and two end sections each of which is connected to an end of a respective one of said neck sections distal from said main pin body, each of said neck sections of said assembling pin having a diameter greater than the width of said neck portion of said connecting hole of each of said first chain plates, said end sections of said assembling pin respectively abutting against said abutment surfaces of said first chain plates, said first hole portion of said connecting hole of each of said first chain plates having a diameter greater than that of said main pin body of said assembling pin and that of one of said end sections of said assembling pin.

27. The link unit as claimed in claim 26, wherein one of said end sections of said assembling pin has a diameter greater than that of the other one of said end sections of said assembling pin and greater than said first hole portion of said connecting hole of each of said first chain plates.

28. The link unit as claimed in claim 1, wherein said first inner end section of each of said first chain plates is formed with a first through hole, the center of said through hole and the curvature centers of said first and second hole portion of said connecting hole of each of said first chain plates being not collinear.

29. A link assembly comprising two interconnected link units, each of said link units including:
two spaced-apart first chain plates, each of said first chain plates having a first inner end section, a first outer end section that is misaligned from said first inner end section, an inner side surface that faces the other one of said first plates, and an outer side surface that is opposite to said inner side surface, said first outer end section of each of said first chain plates being formed with a connecting hole that has a first hole portion, a second hole portion, and a neck portion located between said first and second hole portions, said first inner end section of each of said first chain plates being formed with a first through hole that is configured as a circular hole; and
an assembling pin inserted removably through said connecting hole of each of said first chain plates, and capable of being prevented from moving past said neck portion of each of said first chain plates so as to be positioned in said second hole portion of each of said first chain plates;
wherein said first and second hole portions of each of said first chain plates are aligned respectively with said first and second hole portions of the other one of said first chain plates in an axial direction of said assembling pin, said first through hole of each of said first chain plates being aligned with said first through hole of the other one of said first chain plates in the axial direction of said assembling pin; and
wherein each of said link units further comprises two spaced-apart second chain plates and a connecting pin, each of said second chain plates having a second inner end section, and a second outer end section that is misaligned from said second inner end section, said second outer end section of each of said second chain plates being formed with a connecting hole that is configured as a circular hole, said second inner end section of each of said second chain plates being formed with a second through hole that is configured as a circular hole, said first inner end sections of said first chain plate being disposed between said second outer end sections of said second chain plates, said connecting pin being inserted through said first through holes of said first inner end sections of said first chain plates and said connecting holes of said second outer end sections of said second chain plates, and having two opposite end portions that hold said second chain plates together.

30. The link assembly as claimed in claim 29, wherein said second inner end sections of said second chain plates of one of said link units is disposed between said first outer end sections of said first chain plates of the other one of said link units, said assembling pin of the other one of said link units being removably inserted through said connecting hole of each of said first chain plates of the other one of said link units and said second through holes of said second chain plates of the one of said link units.

* * * * *